US00RE40719E

(19) United States
(12) Reissued Patent
Dominico

(10) Patent Number: US RE40,719 E
(45) Date of Reissued Patent: Jun. 9, 2009

(54) METHOD AND MACHINE FOR SUBSTANTIALLY SIMULTANEOUSLY PRINTING CONTAINERS AND APPLYING LABELS THERETO

(75) Inventor: James W. Dominico, Kinnelon, NJ (US)

(73) Assignee: Polytype America Corporation, Mahwah, NJ (US)

(21) Appl. No.: 11/448,116
(22) Filed: Jun. 6, 2006

Related U.S. Patent Documents

Reissue of:
(64) Patent No.: 6,811,648
Issued: Nov. 2, 2004
Appl. No.: 10/043,547
Filed: Jan. 11, 2002

(51) Int. Cl.
*B65C 3/08* (2006.01)
*B65C 9/06* (2006.01)

(52) U.S. Cl. ..... 156/277; 156/384; 156/387; 156/566; 101/38.1; 101/486

(58) Field of Classification Search ..... 156/277, 156/384, 385, 387, 556, 566, DIG. 8–13, 156/DIG. 33, DIG. 38; 101/35, 38.1, 40, 101/43, 177, 350.1, 484, 486, 490
See application file for complete search history.

(56) References Cited

U.S. PATENT DOCUMENTS

| | | | | | |
|---|---|---|---|---|---|
| 1,956,862 | A | * | 5/1934 | Gantz | 156/385 |
| 3,291,675 | A | * | 12/1966 | Orloff et al. | 156/385 |
| 3,563,170 | A | * | 2/1971 | Cvacho et al. | 101/40 |
| 3,598,043 | A | * | 8/1971 | Schuff | 101/40 |
| 3,680,479 | A | * | 8/1972 | Nichols et al. | 101/38.1 |
| 3,798,109 | A | * | 3/1974 | Gamroth | 156/568 |
| 3,996,851 | A | * | 12/1976 | Urban | 101/40 |
| 4,042,445 | A | * | 8/1977 | Klund et al. | 156/385 |
| 4,332,635 | A | * | 6/1982 | Holbrook et al. | 156/256 |
| 4,337,719 | A | * | 7/1982 | vander Griendt et al. | 118/46 |
| 4,612,079 | A | * | 9/1986 | Ostrow | 156/497 |
| 4,722,271 | A | * | 2/1988 | Tielrooy | 101/38.1 |
| 4,781,112 | A | * | 11/1988 | Cohan | 101/38.1 |
| 4,889,050 | A | * | 12/1989 | Meador | 101/38.1 |
| 4,892,184 | A | * | 1/1990 | vander Griendt et al. | 198/476.1 |
| 4,936,208 | A | * | 6/1990 | Tielrooy | 101/40 |
| 5,120,392 | A | * | 6/1992 | Butkevich et al. | 156/566 |
| 5,173,988 | A | * | 12/1992 | Bhatia et al. | 15/309.2 |
| 5,232,540 | A | * | 8/1993 | Southwell et al. | 156/361 |
| 5,301,802 | A | * | 4/1994 | Nemeroff | 206/217 |
| 5,536,355 | A | * | 7/1996 | Rowland | 156/344 |
| 5,902,449 | A | * | 5/1999 | Moore | 156/541 |
| 5,996,664 | A | * | 12/1999 | Gregoire | 156/350 |
| 6,006,808 | A | * | 12/1999 | Ewert et al. | 156/556 |
| 6,083,342 | A | * | 7/2000 | Frey | 156/297 |
| 7,011,728 | B2 | * | 3/2006 | Dewig et al. | 156/277 |
| 2001/0017181 | A1 | * | 8/2001 | Otruba et al. | 156/64 |
| 2003/0015105 | A1 | * | 1/2003 | Dewig et al. | 101/35 |
| 2005/0145331 | A1 | * | 7/2005 | Dewig et al. | 156/277 |

OTHER PUBLICATIONS

Label–Aire, "High speed pressure–sensitive labeling that's both rugged and reliable," 2 pages, 1992.*

* cited by examiner

*Primary Examiner*—Mark A Osele
(74) *Attorney, Agent, or Firm*—Richard M. Goldberg

(57) ABSTRACT

A machine for printing on containers and applying labels thereto, includes a printing blanket cylinder having a printing blanket thereon; inking assemblies applying ink to the printing blanket; a cylinder having mandrels for holding containers to be printed; a cylinder driving moving the cylinder to position each mandrel in sequence at a printing position adjacent the printing blanket; a mandrel drive rotating each mandrel positioned adjacent the printing blanket in order to rotate a container thereon against the printing blanket to print thereon, except for a predetermined area; a label applying device applying a label to the predetermined area of the container, substantially simultaneously with printing on the container; and a control arrangement which controls timing of the label applying device, the support member drive and the mandrel drive in a manner to ensure that the label is applied to the predetermined area on each container.

20 Claims, 15 Drawing Sheets

METHOD AND MACHINE FOR SUBSTANTIALLY SIMULTANEOUSLY PRINTING CONTAINERS AND APPLYING LABELS THERETO

Matter enclosed in heavy brackets [ ] appears in the original patent but forms no part of this reissue specification; matter printed in italics indicates the additions made by reissue.

BACKGROUND OF THE INVENTION

The present invention relates generally to a printing machine, and more particularly, is directed to a high speed machine for simultaneously printing containers and applying labels thereto.

Printing machines which print on cylindrical or frustoconical shaped drinking cups are well-known in the art, for example, as taught in U.S. Pat. No. 4,892,184.

Basically, in machines of this type, there is a rotatable printing blanket cylinder having a plurality of rubber printing blankets mounted thereon which sequentially pass by different inking assemblies. Each inking assembly has a different color which can be applied to a printing plate associated with it and the printing plate transfers ink to each blanket. When the printing blanket has passed the last inking assembly, all of the desired colors have been placed thereon to form a composite color image.

A rotatable cylinder is also provided and has different mandrels thereon which are each supplied sequentially from a feed assembly with a cup to be printed. As the cup on each respective mandrel passes in front of the printing blanket, it is rotated so that an entire image is printed on the external surface of the cup. The cup is then removed at a subsequent take-of location.

In many instances, it is desirable to adhere a label or other item such as a game card or the like to the exterior surface of the cup as well. In the prior art, this has been performed after the cups are removed from the printing machine, that is, after the image is printed thereon. The labels are then applied on a separate machine. However, this requires an additional operation and a separate machine at a different location, thereby complicating the apparatus and making it more costly, as well as increasing the time for printing the cups and applying the labels thereto.

The reason that the labels have been applied after the printing operation is to wait until the ink has dried so that the labels could properly adhere to the cups. Prior to the present invention, it was not believed capable of simultaneously applying labels to the cups as they were being printed.

OBJECTS AND SUMMARY OF THE INVENTION

Accordingly, it is an object of the present invention to provide a machine for substantially simultaneously printing containers and applying labels thereto that overcomes the aforementioned problems.

It is another object of the present invention to provide a machine for substantially simultaneously printing containers and applying labels thereto, both at the printing position of the machine.

It is still another object of the present invention to provide a machine for substantially simultaneously printing containers and applying labels thereto while the containers are still positioned on the mandrels of the printing machine.

It is yet another object of the present invention to provide a machine for substantially simultaneously printing containers and applying labels thereto that reduces the operation time and operating costs.

In accordance with an aspect of the present invention, a machine for printing on containers and applying labels thereto, includes a printing blanket cylinder having a printing blanket thereon with a blank area corresponding to a predetermined area of a container on which no ink is applied and inking assemblies for applying ink to the printing blanket. A support member is provided, having a plurality of mandrels for holding containers thereon to be printed, along with a support member drive for moving the support member to position each mandrel in sequence at a printing position adjacent the printing blanket. A mandrel drive rotates each mandrel positioned adjacent the printing blanket in order to rotate a container on the mandrel at the printing position against the printing blanket to print on an exterior surface of the container. Further, a label applying device applies a label to the predetermined area of the container on which no ink is applied, substantially simultaneously with printing of the exterior surface of the container. In this regard, a control arrangement controls timing of the label applying device, the support member drive and the mandrel drive in a manner to ensure that the label is applied to the predetermined area on each container.

Preferably, the label applying device is positioned at the printing position. The label applying device includes a grid positioned in facing relation to the exterior surface of the container to be printed; a web transport assembly for transporting a web having labels spaced apart thereon to a position adjacent the grid; a peeling device for peeling each label from the web at the position adjacent the grid; a vacuum supply behind the grid for applying a vacuum through the grid to hold the peeled label against the grid, with an adhesive side of the label facing out; and an arrangement for applying the held label to the predetermined area of the container against the force of the vacuum supply. Preferably, the arrangement includes at least one air jet for blowing the held label onto the predetermined area of the container.

The peeling device preferably includes a sharp edge about which the web is transported.

The control arrangement includes a central processing unit for controlling the timing.

There is also an adjustment arrangement for moving at least a portion of the label applying device relative to the mandrel holding the container to be printed. Specifically, the adjustment arrangement includes at least one linear adjustment mechanism; and at least one angular adjustment mechanism. Preferably, the at least one linear adjustment mechanism includes a first linear adjustment assembly for adjusting the at least a portion of the label applying device in a first linear direction; a second linear adjustment assembly for adjusting the at least a portion of the label applying device in a second linear direction which is substantially orthogonal to the first direction; and a third linear adjustment assembly for adjusting the at least a portion of the label applying device in a third linear direction which is substantially orthogonal to the first and second directions. In addition, the at least one angular adjustment mechanism preferably includes a first angular adjustment assembly for adjusting the at least a portion of the label applying device in a first angular direction; and a second angular adjustment assembly for adjusting the at least a portion of the label applying device in a second angular direction which is substantially orthogonal to the first angular direction.

In addition, the at least a portion of the label applying device includes a grid positioned in facing relation to the mandrel holding the container to be printed, for holding a label thereon.

In accordance with another aspect of the present invention, a method for printing on container and applying labels thereto, includes the steps of applying ink to a printing blanket with a blank area corresponding to a predetermined area of a container on which no ink is to be applied; positioning containers to be printed on a plurality of mandrels; and moving the mandrels in sequence to a printing position adjacent the printing blanket. Each mandrel positioned adjacent the printing blanket then rotated in order to rotate a container on the mandrel at the printing position against the printing blanket to print on an exterior surface of the container. A label is applied to the predetermined area of each container on which no ink is applied, substantially simultaneously with the printing on the container. In this regard, timing of the steps of label application, mandrel movement and mandrel rotation is controlled in a manner to ensure that the label is applied to the predetermined area on each container.

The step of applying the label preferably applies the label at the printing position. The step of applying the label uses a label applying device including a grid positioned in facing relation to a mandrel holding a container, and includes the steps of transporting a web having labels spaced apart thereon to a position adjacent the grid; peeling each label from the web at the position adjacent the grid; applying a vacuum through the grid to hold the peeled label against the grid, with an adhesive side of the label facing out; and forcing the held label oh the predetermined area of the container against the force of the vacuum supply.

Preferably, the step of positioning includes the step of blowing the held label onto the predetermined area of the container.

Preferably, the step of peeling includes the step of transporting the web around a sharp edge adjacent the grid.

In addition, the method further includes the step of adjusting the position of at least a portion of the label applying device relative to a position at which the label is to be applied to the container. This step of adjusting includes the steps of providing at least one linear adjustment of the at least a portion of the label applying device relative to the label applying position; and providing at least one angular adjustment of the at least a portion of the label applying device relative to the label applying position.

The step of providing at least one linear adjustment mechanism includes the steps of adjusting the at least a portion of the label applying device in a first linear direction; adjusting the at least a portion of the label applying device in a second linear direction which is substantially orthogonal to the first direction; and adjusting the at least a portion of the label applying device in a third linear direction which is substantially orthogonal to the first and second directions.

The step of providing at least one angular adjustment mechanism includes the steps of adjusting the at least a portion of the label applying device in a first angular direction; and adjusting the at least a portion of the label applying device in a second angular direction which is substantially orthogonal to the first angular direction.

The above and other objects, features and advantages of the invention will become readily apparent from the following detailed description thereof which is to be read in connection with the accompanying drawing.

DETAILED DESCRIPTION

Figure 1:
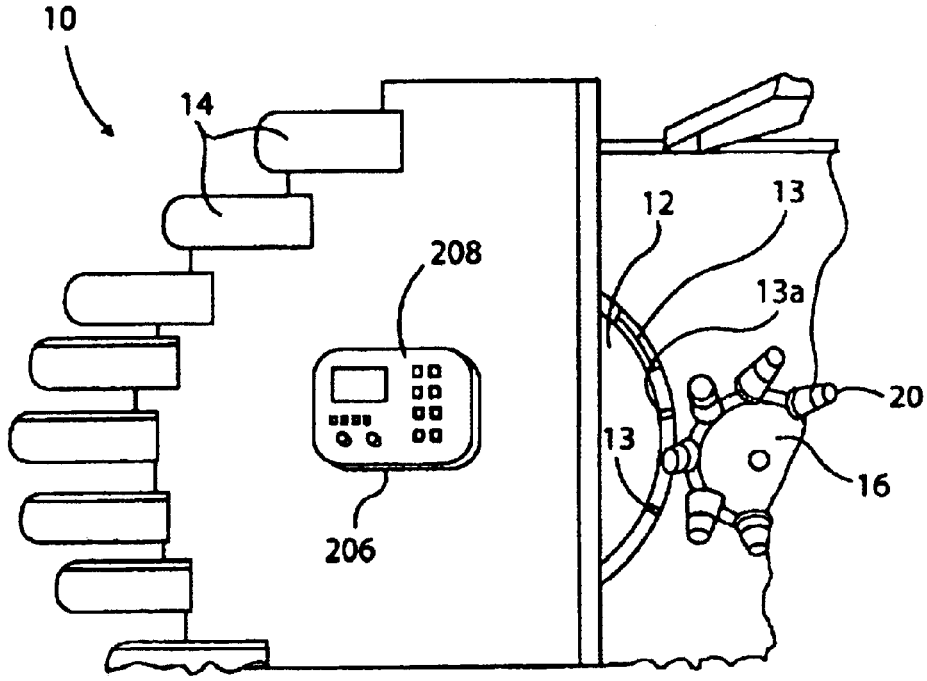
FIG. 1 is a perspective view of a printing and label applying machine according to the present invention.
Figure 2:
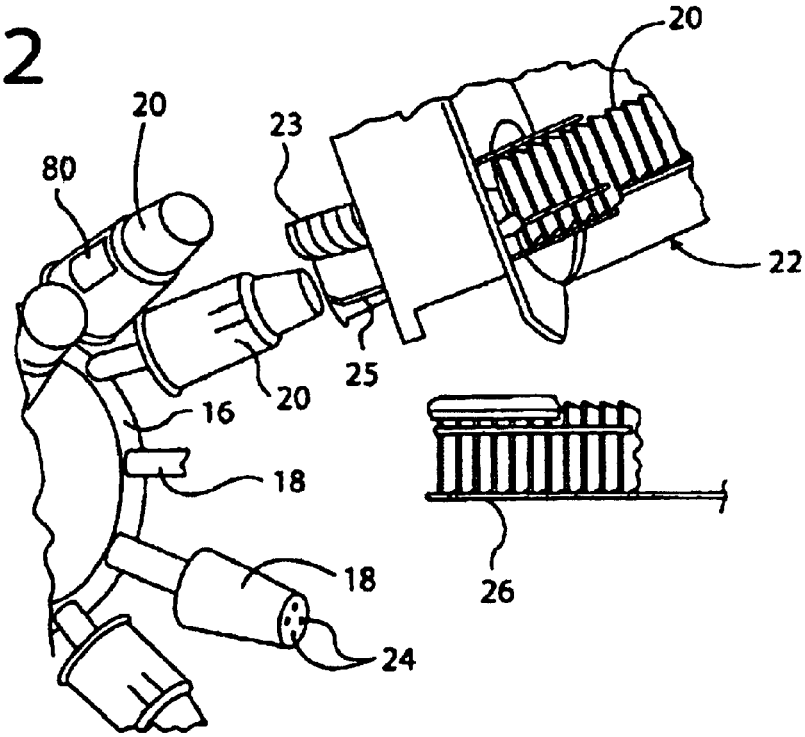
FIG. 2 is an enlarged perspective view of the infeed and take-off assemblies of the printing machine of FIG. 1.
Figure 3:
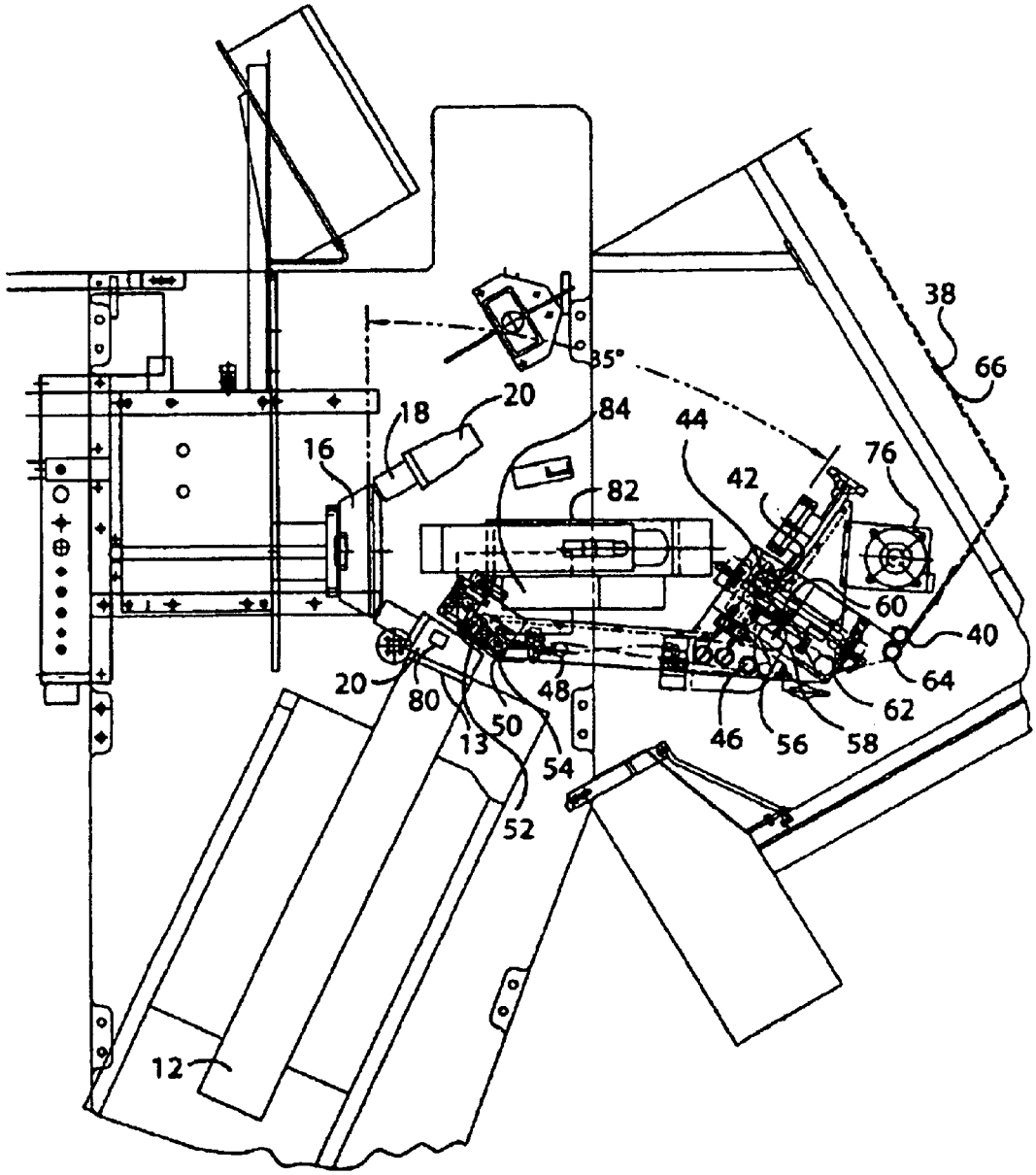
FIG. 3 is a top plan view of the printing machine of FIG. 1.
Figure 4:
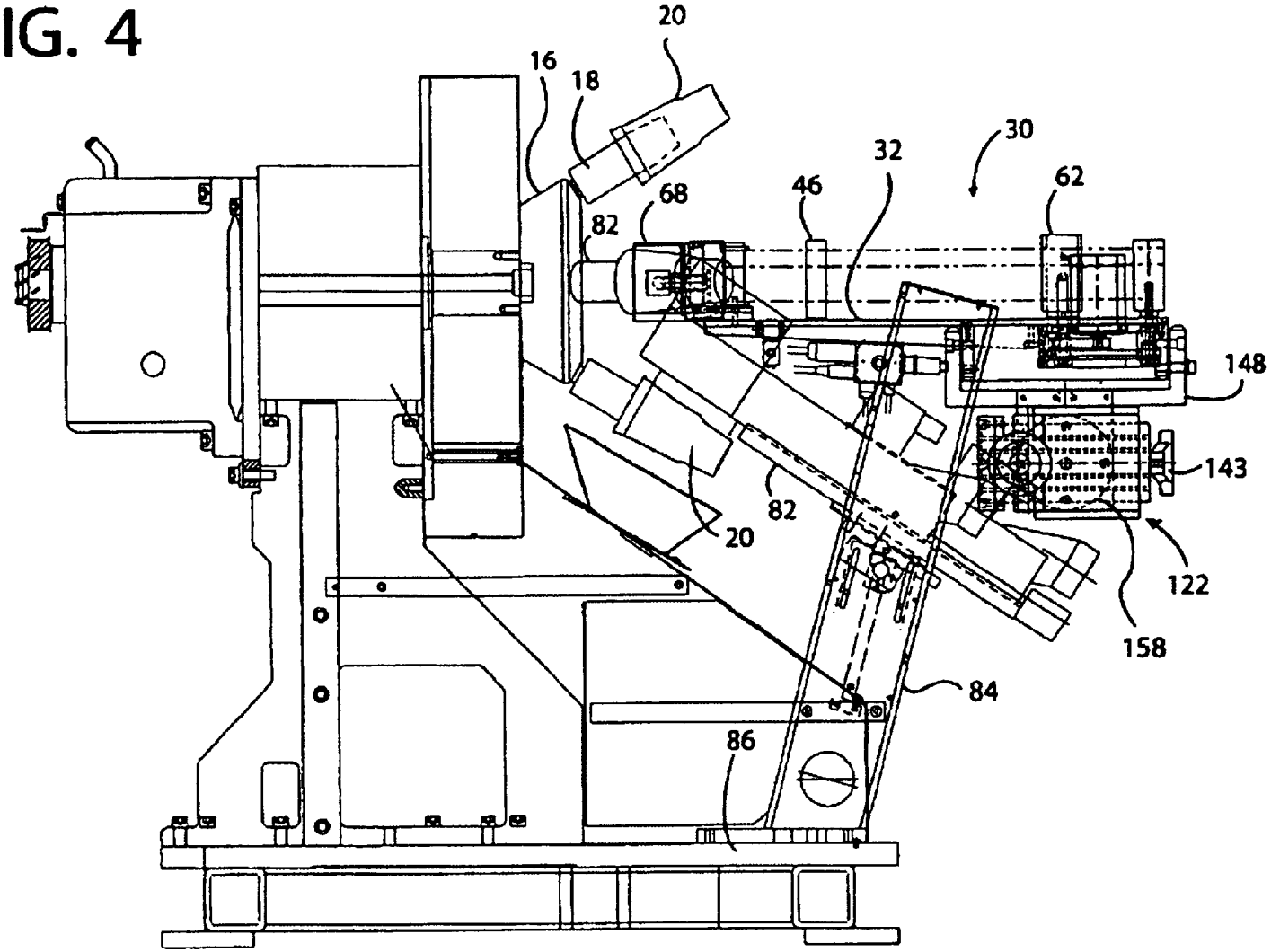
FIG. 4 is a side elevational view of the printing machine of FIG. 1.
Figure 5:
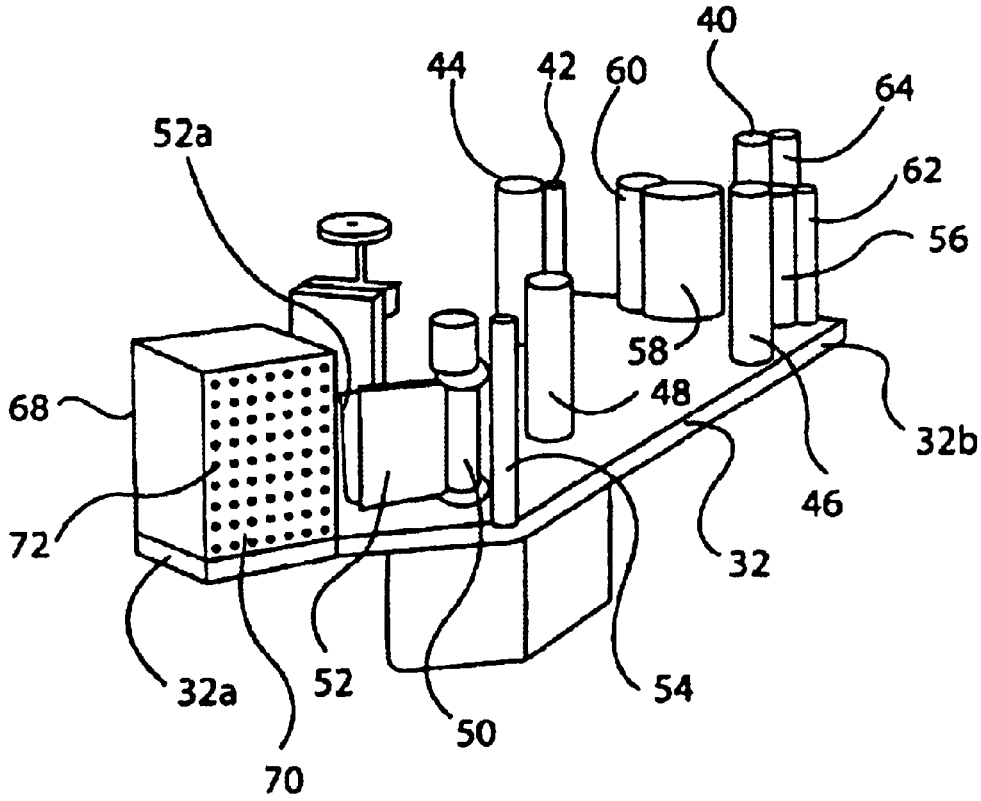
FIG. 5 is a perspective view of the label applying device.
Figure 6:
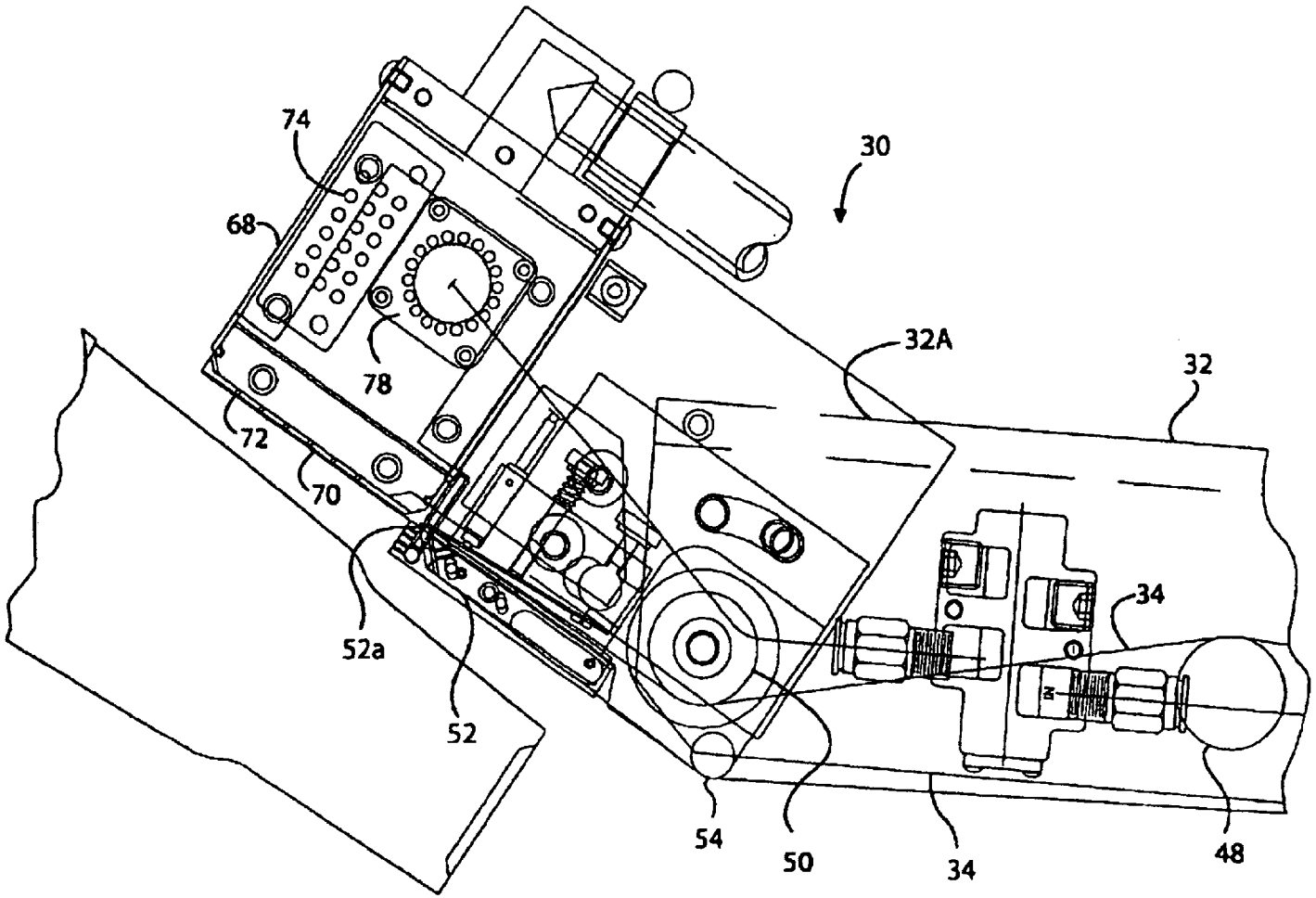
FIG. 6 is an enlarged, partially cut-away, top plan view of the vacuum end of the label applying device of FIG. 5.
Figure 7:
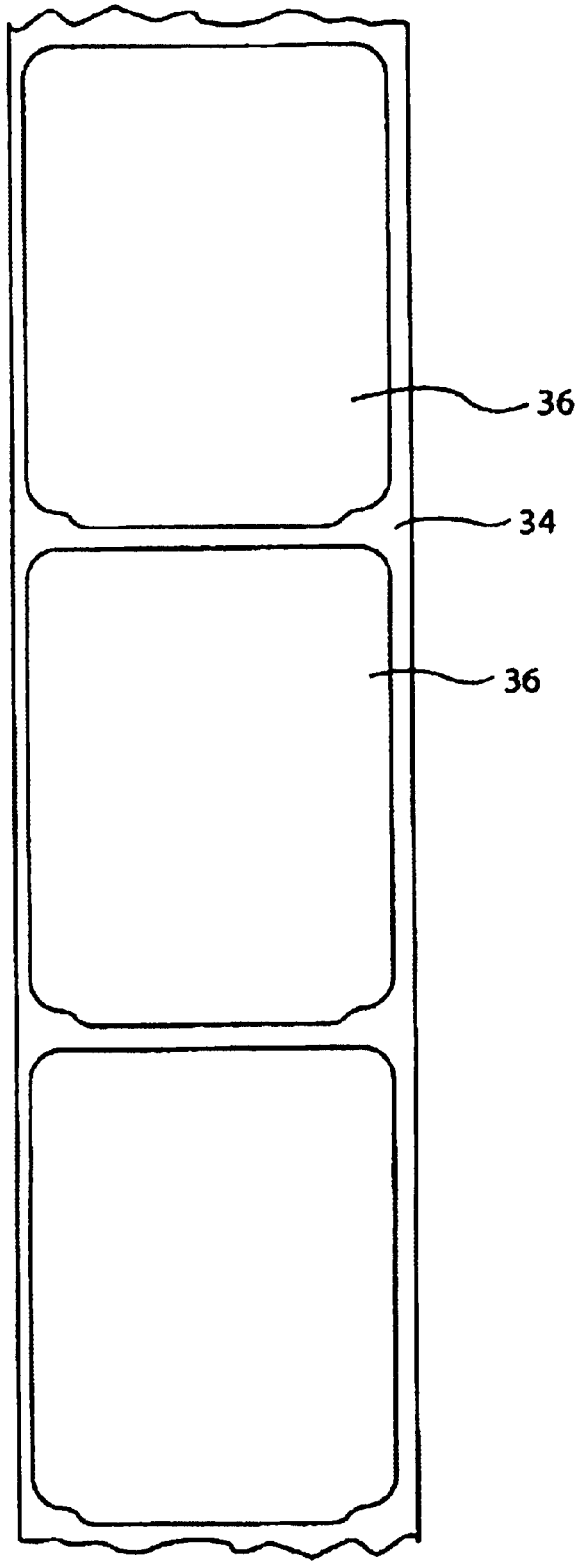
FIG. 7 is top plan view of an actual size web with labels thereon that can be used with the present invention.

Referring to the drawings, and initially to FIGS. 1 and 2, a machine 10 for substantially simultaneously printing on containers, such as frusto-conical shaped cups, and applying labels thereto according to the present invention will now be described. It will be appreciated, however, that reference to cups throughout the application is for ease of explanation and the present application can be used with any cylindrical or frusto-conical shaped member, whether a container or not, having an external surface on which printing occurs and labels are adhered.

Machine 10 includes a rotatable printing blanket cylinder 12 having a plurality of rubber printing blankets 13 thereon. Printing blanket cylinder 12 sequentially passes by different inking assemblies 14 arranged in spaced relation around printing blanket 12. Each inking assembly 14 is arranged to apply a different color to printing blankets 13. When a printing blanket 13 has passed by the last inking assembly 14, all of the selected colors will have been placed on printing blanket 13, to form a composite color image thereon. As will be understood from the discussion hereinafter, printing blanket 13 has a blank area 13a which corresponds to a predetermined area on the cup that will not be printed.

Figure 11:
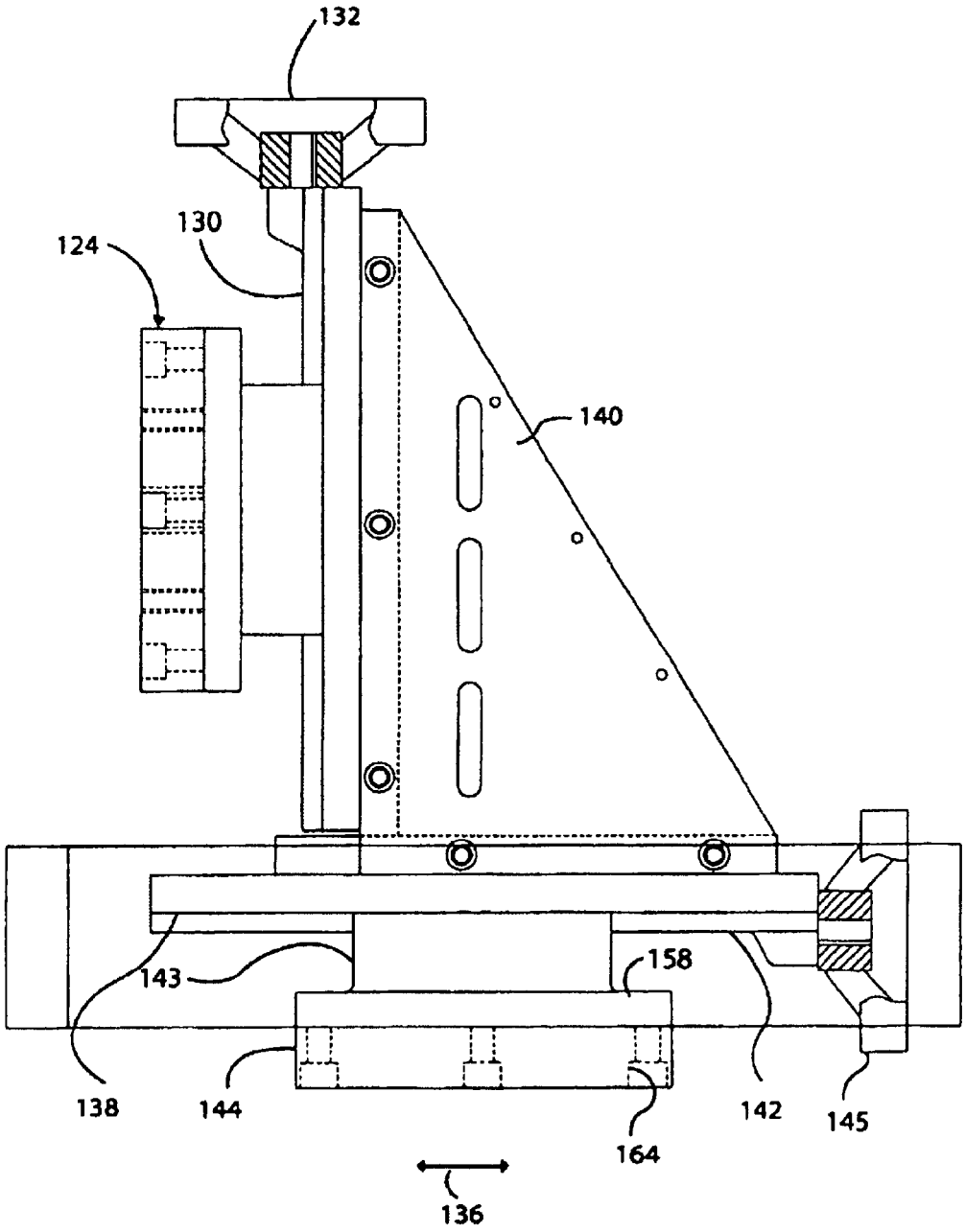
FIG. 11 is an enlarged plan view of the horizontal two axis linear adjustment assemblies.
Figure 12:
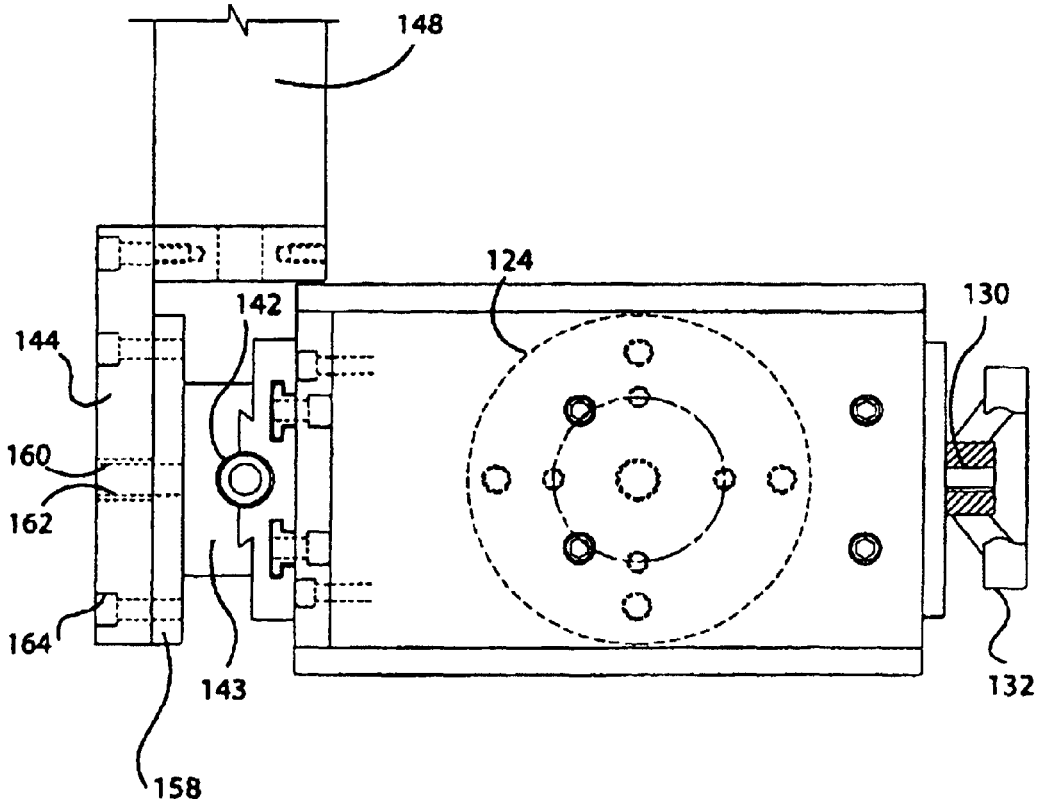
FIG. 12 is an enlarged elevational view of the horizontal two axis linear adjustment assemblies.
Figure 14:
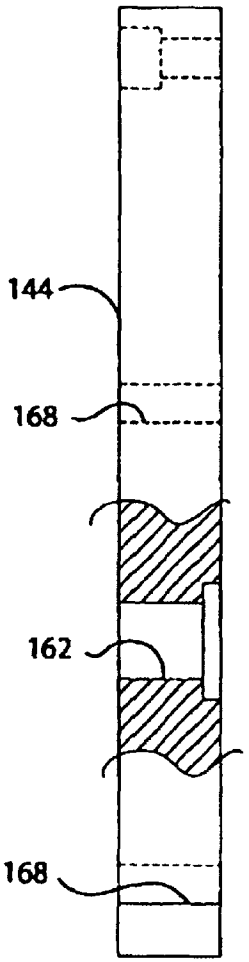
FIG. 14 is a side elevational view of the downwardly extending plate.
Figure 13:
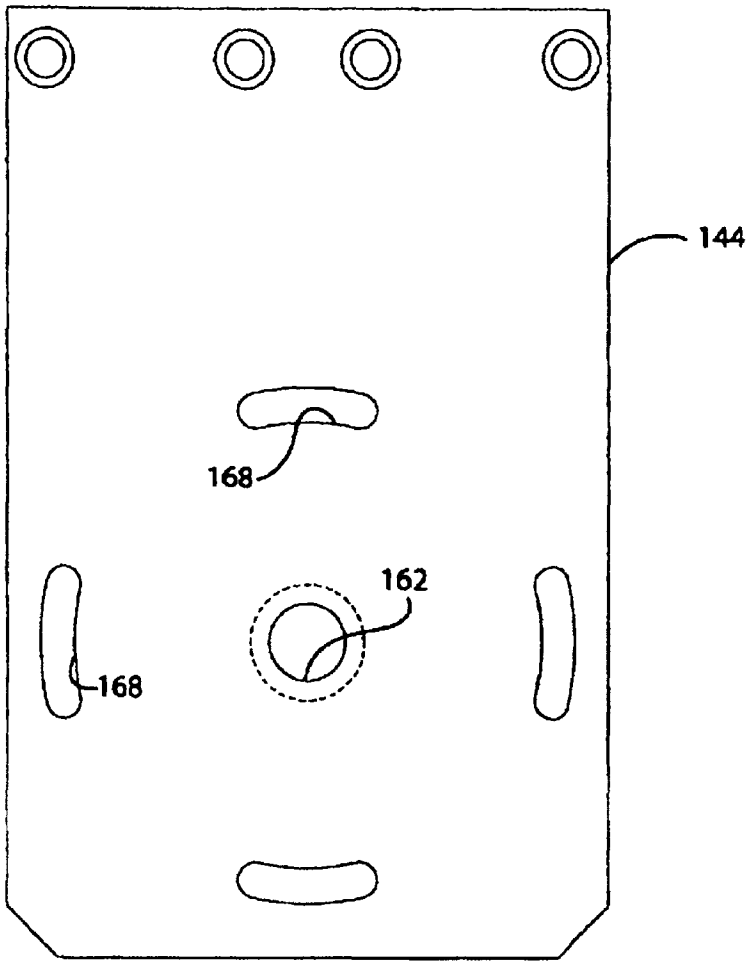
FIG. 13 is a plan view of the downwardly extending plate.
Figure 15:
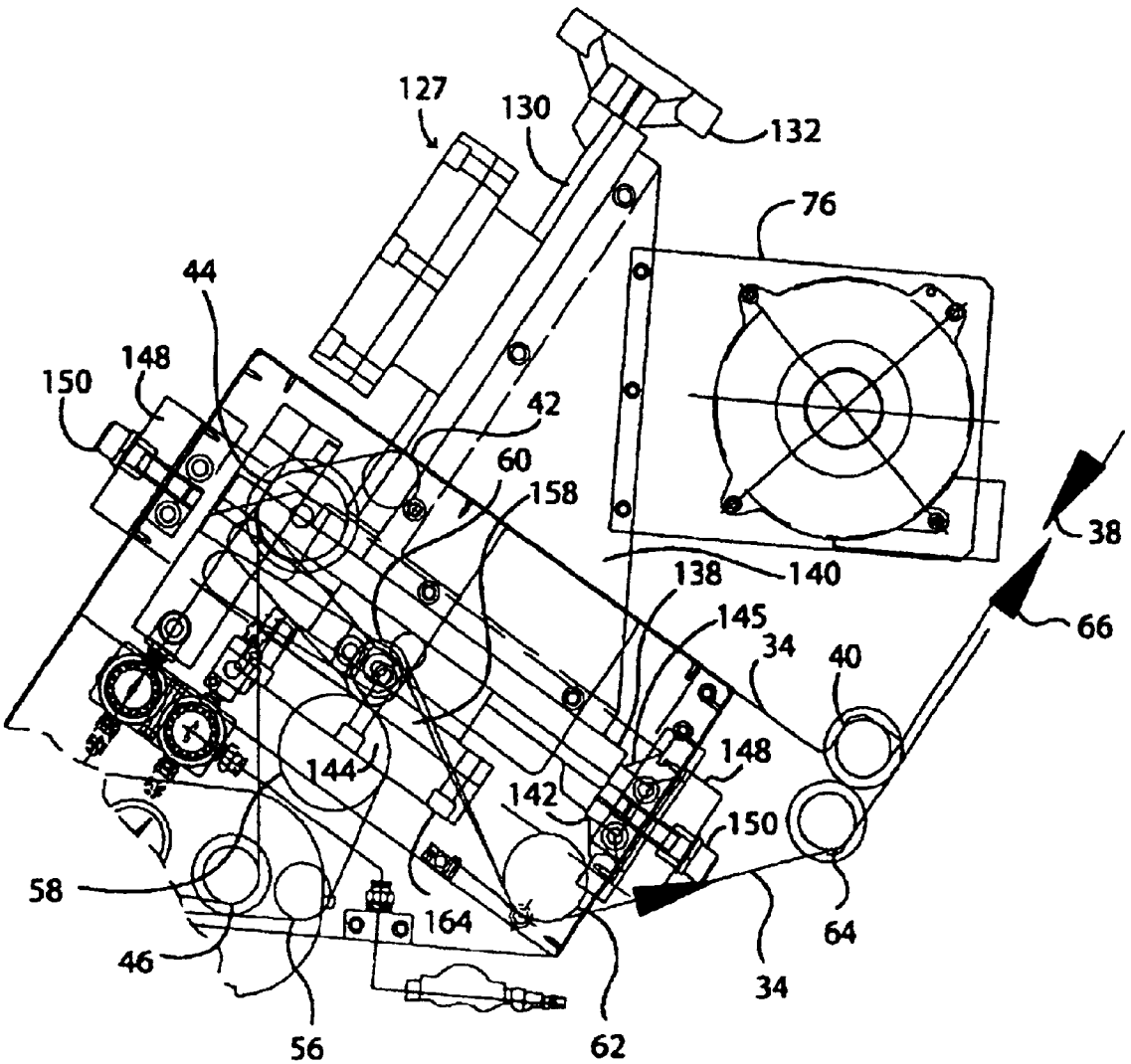
FIG. 15 is an enlarged top plan view of the adjustment assembly.

A rotatable cylinder 16 is provided having different mandrels 18 spaced apart at the circumferential edge thereof. Each mandrel 18 is supplied sequentially with a cup 20 or other container or the like having an exterior surface to be printed by printing blanket 13. Cups 20 are supplied in a stacked relation, as shown in FIG. 2, from an inclined conveyor 22. A scroll or screw 23 engages the lip of each forwardmost cup 20 in the stack and pulls that cup slightly away from the other cups, for example, by a distance of about one inch. Air jets 25 then blow the forwardmost cup 20 onto the mandrel 18 at this position, for example, at the clock position of about one thirty o'clock (1:30). Each mandrel 18 has bore holes 24 therein which are in fluid communication with a vacuum supply 214 (FIG. 11) associated with each mandrel 18 to hold the cup 20 thereon, as is well known.

As the cup 20 on each respective mandrel 18 passes to the printing position of printing blanket 13, that mandrel 18 is rotated about its own axis. The printing position can occur at any angular position, but is preferably located at the clock position of nine o'clock (9:00) of rotatable cylinder 16. Since the cup 20 in this printing position is in contact with printing blanket 13, an image is printed on the external surface of the cup 20, except in the predetermined area 80 thereof. Rotatable cylinder 16 is then rotated in order to sequentially move a new mandrel 18 and cup 20 thereon to the printing position and to move the printed cups 20 to a take-off position, for example, at a clock position of three o'clock (3:00). At the take-off position, the vacuum associated with each mandrel 18 is released, and air jets 216 (FIG. 16) blow the printed cup 20 off the mandrel 18 and into a stack of printed cups on a take-off conveyor 26 or the like.

A printing apparatus of the above described type is sold by the assignee of the present application, Polytype America, Inc., for example, under Model Nos. BDM 611-916 and 611-920.

As discussed above, in many instances, it is desirable to adhere a label or other item such as a game card or the like to the exterior surface of each cup 20 as well. In the prior art, this has been performed after cups 20 are removed from the printing machine, that is, after the image is printed thereon and the ink has dried. This is because the labels will not adhere to wet ink. The labels are then applied at a later time to the printed cups 20 in a separate machine. However, this requires an additional operation and a separate machine at a different location, thereby complicating the apparatus and making it more costly, as well as increasing the time for printing the cups and applying the labels thereto.

In accordance with the present invention, the labels are applied to cups 20 substantially simultaneously with the printing of cups 20 at the nine o'clock printing position, that is, at the same time that cups 20 are in contact with printing blanket 13 and rotated.

Specifically, as shown in FIGS. 3–9, a label applying device 30 is provided at the nine o'clock printing position for applying a label to each cup 20 as that cup is being printed. Label applying device 30 can be any suitable label applicator, but is preferably one sold by Label-Aire, Inc. of 550 Burning Tree Rd. Fullerton, Calif. 92833 under Model No. 2111HS which is a high speed air-blow label applicator that can apply labels accurately at a speed of 1000 labels/minute and which is specifically designed for high speed continuous run applications.

As shown, label applying device 30 includes a planar support plate 32 which is angled. One end 32a of support plate 32 is positioned adjacent to the cup 20 at the nine o'clock printing position and to the opposite side of printing blanket 12. An opposite end 32b of support plate 32 includes guide rollers for guiding an elongated web 34 from a web supply roll (not shown) to end 32a. Web 34 has a plurality of spaced apart labels 36 adhered thereon with a release adhesive. Web 34 is transported from the web supply roll in the direction of arrow 38 in FIG. 3, around a first through fourth rollers 40, 42, 44 and 46, all mounted on support plate 32 at the opposite end 32b, and then around a fifth roller 48 at a center portion of support plate 32. From fifth roller 48, web 34 is transported around a sixth roller 50 and then across the rear face of a knife plate 52 to a sharp forward edge 52a thereof. At sharp forward edge 52a, web 34 is forced to make a sharp 180° turn and returns across the front face of knife plate 52 and then around rollers 54, 56, 58, 60, 62 and 64, in sequence to return to a waste web roll (not shown) or other waste depository in the direction of arrow 66.

At sharp forward edge 52a, because web 34 is more flexible than labels 36, labels 36 peel off from web 34. A housing 68 having a grid plate 70 with a plurality of holes 72, is provided adjacent to sharp forward edge 52a. At the same time that a label 36 peels off from web 34, and in timed relation thereto, a vacuum is applied through a manifold 74 in housing 68 by a vacuum pump 76 positioned to the lower side of support plate 32. As a result, the peeled label 36 is held, adhesive side out, to grid plate 70. In addition, housing 68 includes an air jet supply therein. At an appropriate time, in timed relation to the rotation of cup 20 at the nine o'clock position, the vacuum is overpowered by an air supply in order to release the held label 36, and specifically, air jet supply 78 is activated to blow the peeled label 36 onto predetermined area 80 of cup 20.

In accordance with the present invention, the cup 20 at the nine o'clock printing position is printed on its exterior surface except in predetermined area 80. Accordingly, when predetermined area 80 is facing grid plate 70, the peeled label 36 is blown onto predetermined area 80. Since there is no ink on predetermined area 80, label 36 adheres to cup 20 without any worry of whether or not the ink is dry. In this regard, the peeled label 36 is adhered substantially simultaneously with the printing of the cup 20, that is, while the cup is being rotated during the printing operation. The cup 20 is subsequently rotated with the respective mandrel 18 to a further position where the ink is cured by a UV lamp 82 mounted to a support post 84 fixed to a machine frame 86.

Label applying device 30 can be adjusted in position relative to the cup 20 at the nine o'clock printing position, for example, depending upon the length and diameter of the cup 20 being printed.

Specifically, machine 10 includes an adjustment assembly 122 having a first linear adjustment assembly for adjusting support plate 32 in a first linear (vertical) direction, as shown in FIGS. 4 and 8–15. In this regard, a plate 90 is secured to the upper end of support post 84 by bolts 92, as shown best in FIGS. 9 and 10. Plate 90 has a bend which forms an extension as a vertical lift bracket 94 thereof that is secured to a plate 96 of a vertical mounting assembly. A washer 98 is positioned flush against plate 96, and an extension plate 100 is positioned flush against washer 98. Two gibs 102 are fixed against the opposite surface of extension plate 100, at opposite sides thereof, to form a guide track in which a vertical slide plate 104 slides. A handle 106 includes a threaded extension 107 that extends through an elongated slot 108 in plate 96, through washer 98, through an aligned elongated slot 110 in extension plate 100 and is threadedly received in vertical slide plate 104. In this manner, handle 106 can be turned to rotate threaded extension 107 so as to pull vertical slide plate 104 tightly against extension plate 100, and thereby, releasably lock vertical slide plate 104 in a desired position. When handle 106 is rotated in the opposite direction, vertical slide plate 104 is free to slide in the guide track formed by extension plate 100 and gibs 102.

In order to facilitate this moving of vertical slide plate 104 within the guide track, a lower screw adjustment block 112 is mounted to vertical slide plate 104 and an upper screw adjustment block is mounted in vertically spaced relation thereabove to extension plate 100 above gibs 102, with a bushing 116 provided in upper screw adjustment block 114. A vertical lift screw 118 extends through bushing 116 of upper screw adjustment block 114 and is threaded within lower screw adjustment block 112. A knob 120 is secured to the upper end of vertical lift screw 118 that extends out of upper screw adjustment block 114. Thus, when knob 120 is rotated, vertical lift screw 118 is rotated therewith, in order to move vertical slide plate 104 up or down.

Figure 8:
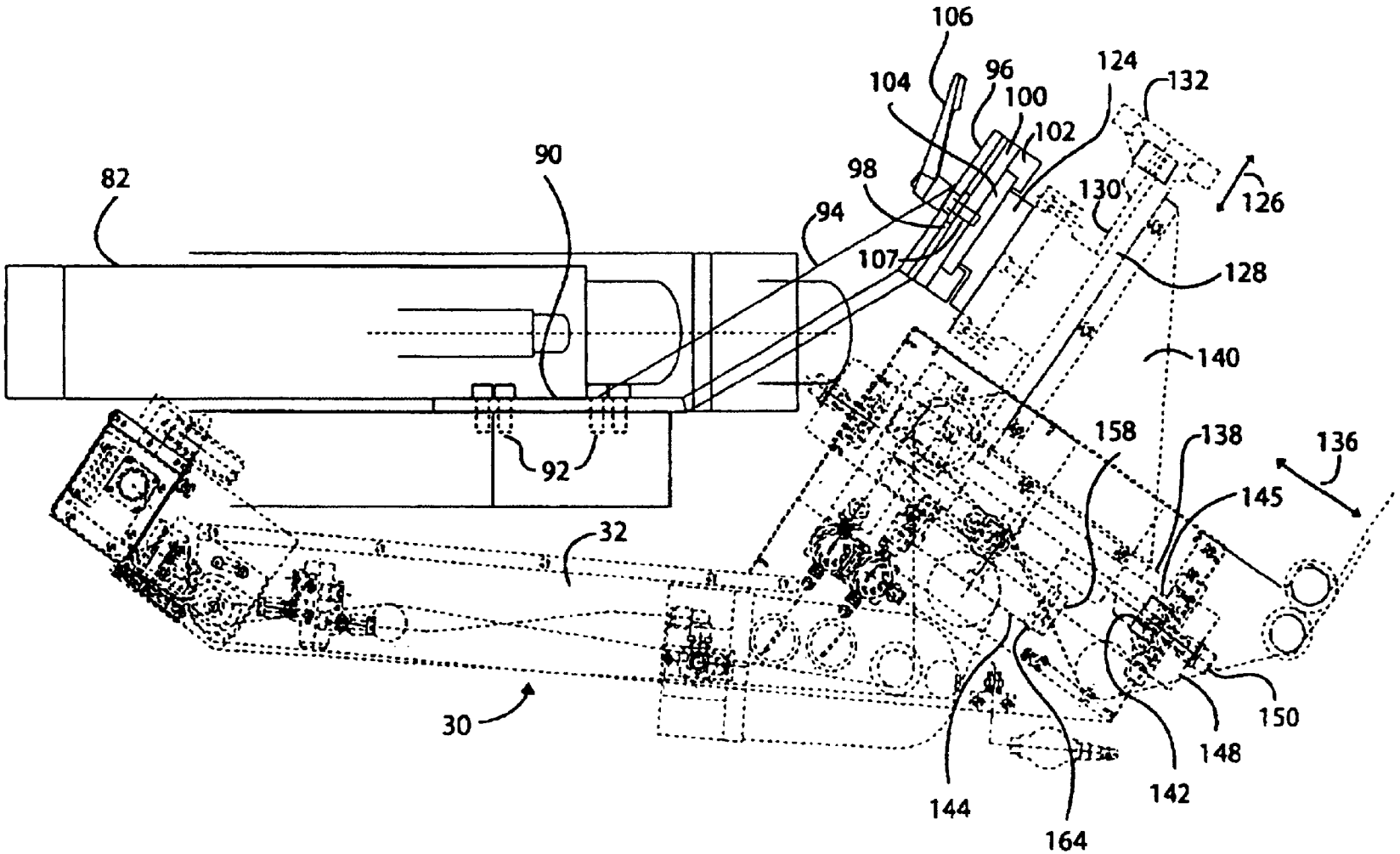
FIG. 8 is an enlarged top plan view of the label applying device of FIG. 5.
Figure 9:
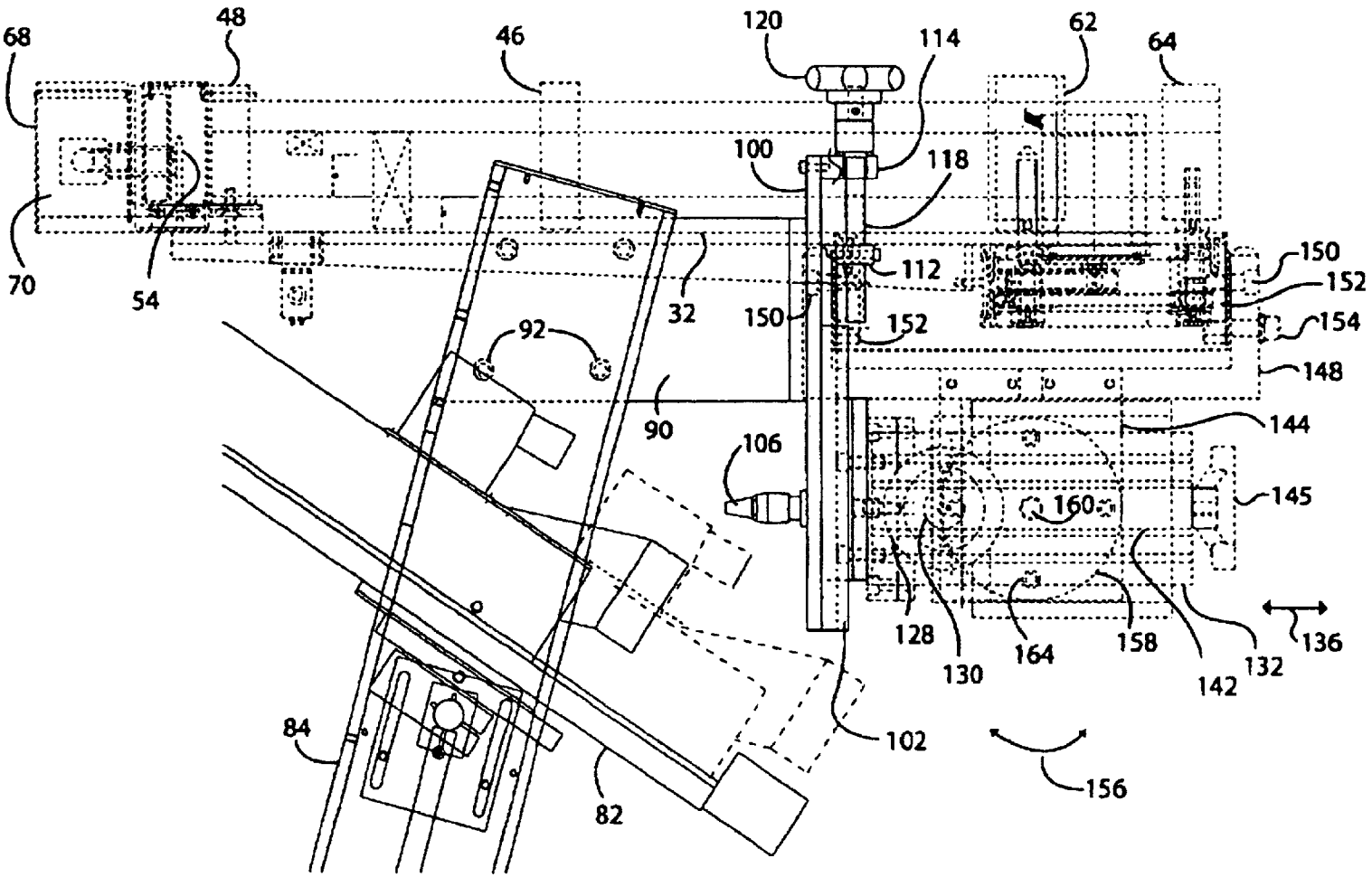
FIG. 9 is an enlarged side elevational plan view of the label applying device of FIG. 5.
Figure 10:
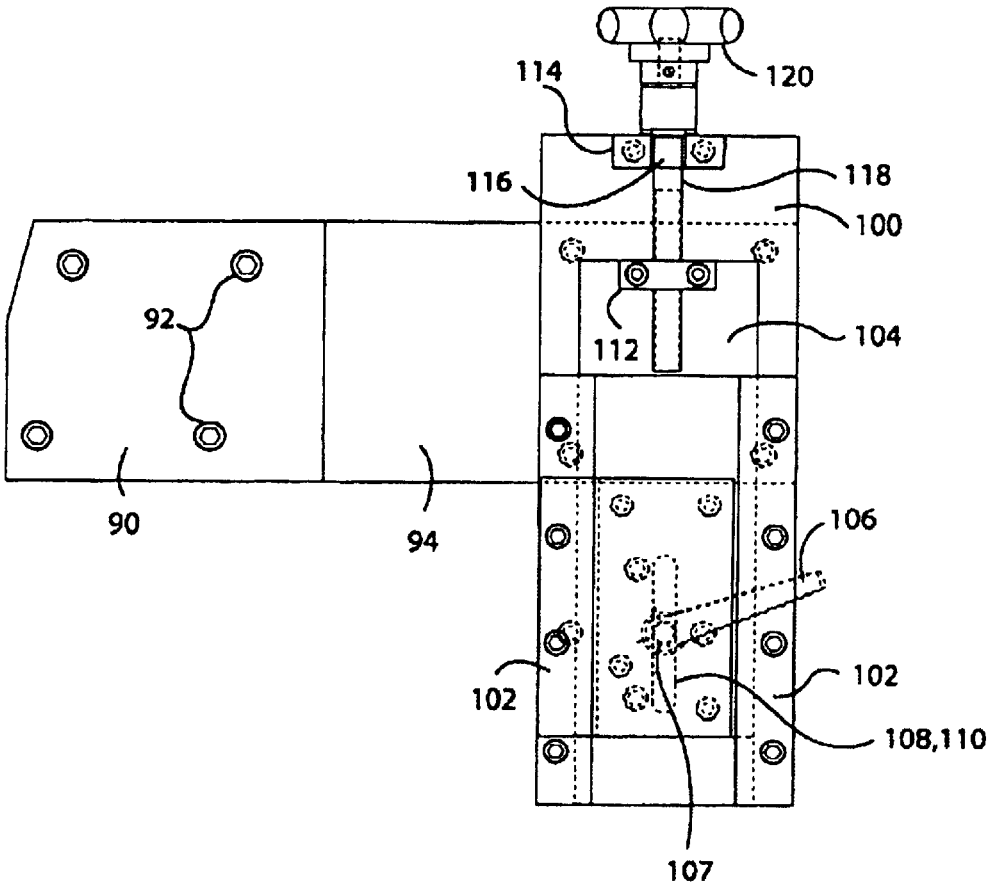
FIG. 10 is a side elevational view of the vertical adjustment assembly for the label applying device of FIG. 5.

As shown best in FIG. 8, vertical slide plate 104 is fixedly connected with an intermediate connecting member 124 that is connected to a second linear adjustment assembly of adjustment assembly 122, for adjusting support plate 32 in a second linear direction 126 substantially orthogonal to the first linear (vertical) direction. Specifically, the second linear adjustment assembly includes a housing 128, and a threaded rod 130 extends through housing 128 and intermediate connecting member 124. An adjustment knob 132 is secured to an end of threaded rod 130 that extends out of housing 128. Thus, as adjustment knob 132 is turned, threaded rod 130 is also rotated. Since intermediate connecting member 124 cannot move laterally, housing 128 is caused to slide in the second linear direction of double-headed arrow 134. This, in turn, as will be understood from the discussion which follows, causes support plate 32 to move in the same direction.

Adjustment assembly 122 includes a third linear adjustment assembly for adjusting support plate 32 in a third linear direction 136 substantially orthogonal to the first and second linear directions. Specifically, the third linear adjustment assembly includes a second housing 138 fixedly connected to first housing 128 by a triangular support plate 140. A threaded rod 142 extends through second housing 138 and through an extension 143 of a circular plate 158. Accordingly, as threaded rod 142 is rotated by a knob 145 secured thereto, circular plate 158 slides in the direction of double-headed arrow 136 relative to second housing 138.

Adjustment assembly 122 further includes a first angular adjustment assembly for adjusting the angular position of support plate 32 in a first angular direction, represented by double-headed arrow 156. Specifically, the first angular adjustment assembly includes circular plate 158 in facing relation to a downwardly extending plate 144 and journaled in a central opening 162 thereof by a journal pin 160. Circular plate 158 includes a plurality, for example, four, tightening bolts 164 that extend into arcuate grooves 168 in downwardly extending plate 144 and can be tightened therewith. In this manner, downwardly extending plate 144, in addition to being movable linearly with circular plate 158 relative to first housing 138, can be rotated in the direction of double-headed arrow 156 about journal pin 160 to a desired angular position in the first angular direction and then tightening bolts 164 are tightened to releasably fix downwardly extending plate 144, and thereby support plate 32 connected therewith, in a desired angular position.

Adjustment assembly 122 includes a second first angular adjustment assembly including a U-shaped support member 148 that is pivotally connected by pivot pins 150 to two arm extensions 152 that extend down from the underside of support plate 32. A locking bolt 154 is provided at one end of U-shaped support member 148 and fits within a groove (not shown) in the adjacent arm extension 152 for locking arm extensions 152, and thereby support plate 32, in a desired angular position relative to U-shaped support member 148. Downwardly extending plate 144 is connected to the underside of, and extends down from, U-shaped support member 148.

In accordance with the present invention, after label applying device 30 is oriented so that grid plate 70 is moved in opposition to the exterior surface of the cup 20 at the nine o'clock printing position, machine 10 can be operated.

In order to do so, it is necessary to provide specific timing between rotation of printing blanket cylinder 12, rotation of mandrels 18, movement of web 34, and operation of vacuum pump 76 and air jet supply 78, so that labels 36 are blown onto the predetermined area 80 of each cup 20 at the nine o'clock printing position substantially simultaneously with the printing of the cups.

Figure 16:
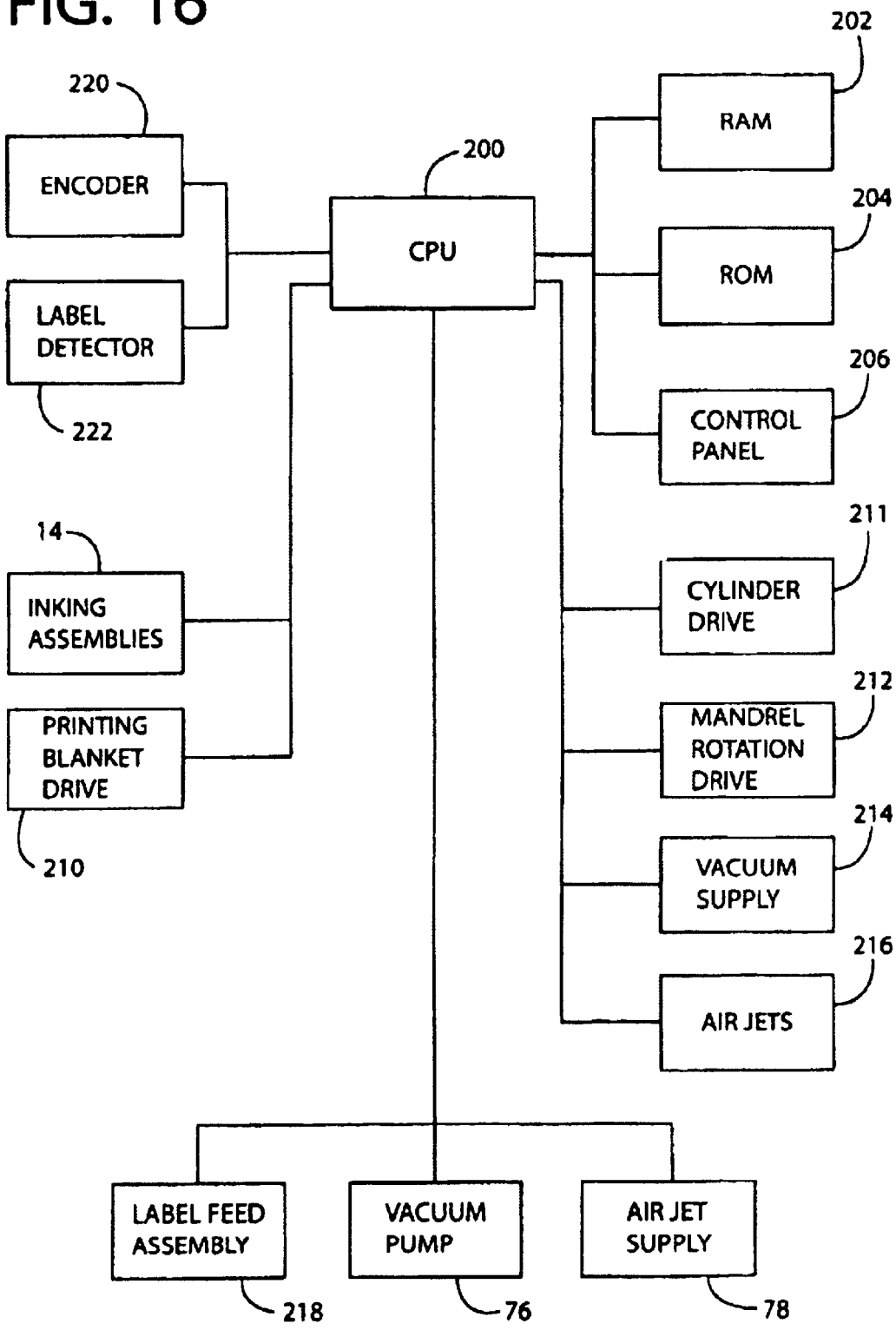
FIG. 16 is a block diagram of the circuitry for the printing and label applying machine according to the present invention.

In this regard, and referring to FIG. 16, a central processing unit (CPU) 200 is connected with a working random access memory (RAM) 202 and read only memory (ROM) 204 for storing an operating system and programs to be run. CPU 200 is controlled by a control panel 206 on the outside of the machine frame and which has a plurality of buttons 208 (FIG. 1) by which an operator can control operation of machine 10.

CPU 200 is connected with inking assemblies 14 and a drive 210 for printing blanket cylinder 12 of the printing portion of machine 10. It will be appreciated that the predetermined area 80 which is not printed is a result of the formation of an unprinted area 13a in printing blanket 13 so that no ink is collected thereon. CPU 200 is also connected with mandrels 18, and specifically, with the drive 211 for rotating cylinder 16 and the drive 212 for rotating each mandrel 18 about its own axis, as well as the vacuum supply 214 and air jets 216 for each mandrel 18 in order to hold cups 20 thereon and blow cups 20 off. Finally, CPU 200 is also connected with label applying device 30, and specifically, to the label feed assembly 218 associated with label applying device 30, as well as vacuum pump 76 and air jet supply 78.

Figure 17:
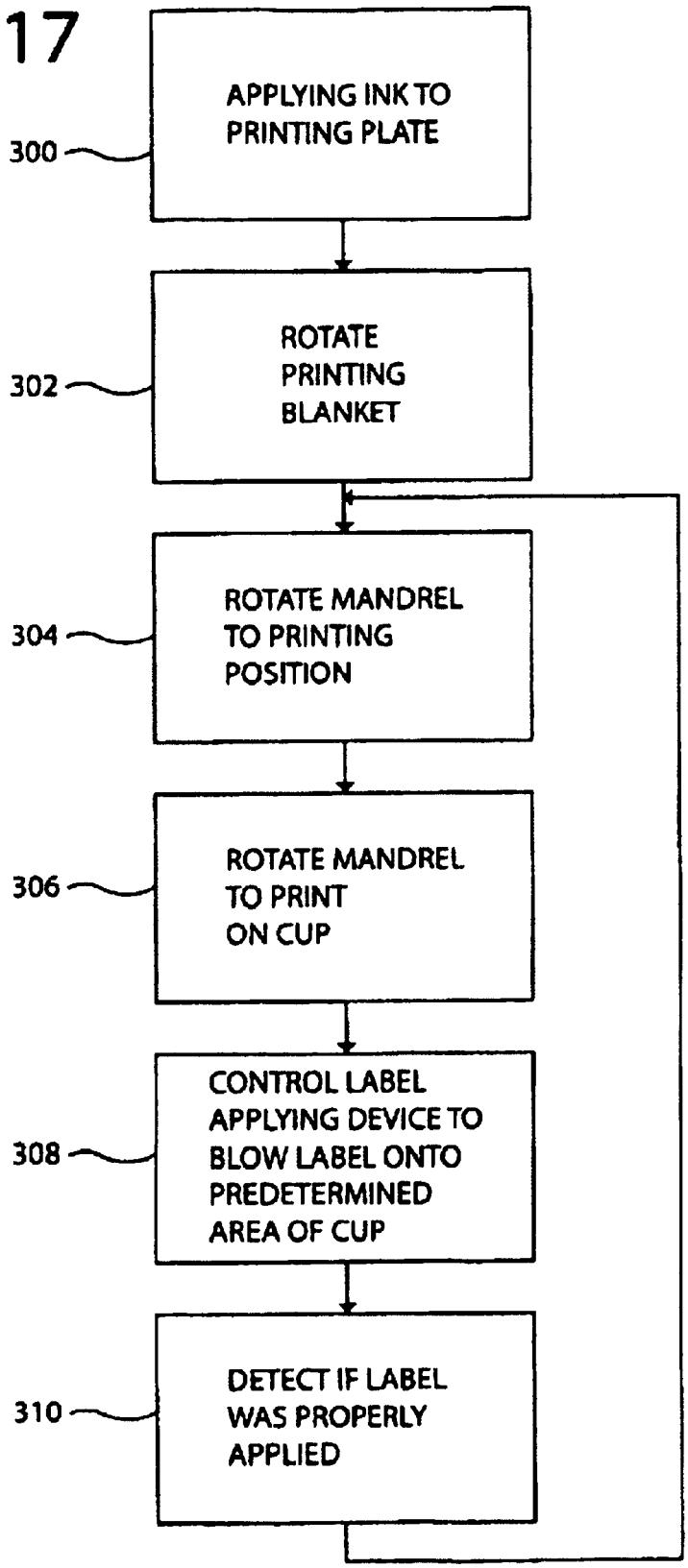
FIG. 17 is a flow chart diagram illustrating the steps of operation of the printing and label applying machine according to the present invention.

With this arrangement, and referring to the flow chart diagram of FIG. 17, in a first step 300, CPU 200 controls selected inking assemblies 14 to apply ink to printing blanket 13 on printing blanket cylinder 12 as printing blanket cylinder 12 is rotated past the respective inking assemblies 14. Then, in step 302, printing blanket cylinder 12 is moved to the nine o'clock printing position, and in step 304, CPU 200 controls drive 211 for cylinder 16 in order to rotate a mandrel 18 with a cup 20 to be printed thereon, to the nine o'clock printing position. A vacuum is applied by vacuum supply 214 to retain the cup 20 on the respective mandrel 18. In addition, CPU 200 controls mandrel rotation drive 212 to rotate the mandrel 18 at the nine o'clock printing position, and thereby to rotate the cup 20 thereon against printing blanket 13 in order to print on the exterior surface of the cup 20. An encoder 220 within the machine transmission provides a signal corresponding to when predetermined area 80 on the cup 20 becomes available for receiving a label, to CPU 200. Based on this signal, in step 308, CPU 200 controls label applying device 30 to apply a label 36 to cup 20, and in particular, to predetermined area 80, as mandrel 18 is being rotated during the printing operation. Specifically, CPU 200 controls a label feed assembly 218 as to the rate of supply of web 34, vacuum pump 76 in order to capture a label 36 with its adhesive side facing out against grid plate 70, and air jet supply 78 to control blowing of the label 36 onto predetermined area 80 of cup 20.

Thereafter, in step 310, either at the nine o'clock printing position or a later rotated position, a label detector 222 mounted to the machine detects whether the label 36 has been properly applied to predetermined area 80, and supplies an appropriate signal to CPU 200. This can occur by detecting if the label extends outside predetermined area 80 by a distance of, for example, one-eighth inch, by comparing a detection to a desired location present in RAM 202 or ROM 204, or if no label is present at all. In such a case, at a later position, cup 20 is rejected and is not removed to take-off conveyor 26, but rather, is removed to a reject pile or conveyor.

Thereafter, the process returns to step 304 to print and apply a label to the next cup 20 on the adjacent mandrel 18 which is moved to the nine o'clock printing position.

It will therefore be appreciated that a label 36 can be applied to a cup 20 at the printing position substantially simultaneously with the printing operation. In accordance with the present invention, substantially simultaneously refers to application of the label 36 to the predetermined area 80 of each cup 20 at the same time that the cup is being printed, immediately before the cup is printed or immediately after the cup is printed, but without having to wait for the ink to dry. It is not necessary that the label 36 be applied at the same position that printing occurs. For example, label applying device 30 can be arranged at the next rotation position of mandrels 16, that is, before the cup is removed from the mandrel 16, and this would also constitute substantially simultaneous printing and application of labels to the cups.

Alternatively, the labels can be applied, while cups 20 are still on the mandrels 18, but after the cups 20 have passed the UV drying station. In such case, a register mark would be placed on the cups 20 and a sensor eye would be used with the same to control label application. This is also within the scope of substantially simultaneously.

Having described a specific preferred embodiment of the invention with reference to the accompanying drawings, it will be appreciated that the present invention is not limited to that precise embodiment, and that various changes and modifications can be effected therein by one of ordinary skill in the art without departing from the scope or spirit of the invention as defined by the appended claims.

What is claimed is:

[1. A method for printing on containers and applying labels thereto, comprising the steps of:

moving containers, one at a time, to a printing station of a printing device;

applying printing ink in an image onto an exterior surface of a container moved to the printing station;

applying a label to an area of the container on which no ink is applied, when said container is at said printing station; and controlling timing of a label applying device, a device for moving the containers and the printing device in a manner to ensure that the label is applied to said area on each container at said printing station.]

[2. A method according to claim 1, wherein said step of applying the label to said area of the container on which no ink is applied, occurs substantially simultaneous, with printing of the exterior surface of the container.]

[3. A machine for printing on containers and applying labels thereto, comprising:

a printing device having a printing station for applying printing ink in an image onto an exterior surface of a container thereat;

a movable support for moving containers, one at a time, to said printing station to be printed with said image;

a label applying device for applying a label to an area of the container on which no ink is applied, when said container is at said printing station; and a control arrangement for controlling timing of said label applying device, said movable support and said printing device in a manner to ensure that the label is applied to said area on each container at said printing station.]

[4. A machine according to claim 3, wherein said label applying device applies a label to said area of the container on which no ink is applied, substantially simultaneously with printing of the exterior surface of the container.]

5. A machine for printing on containers and applying labels thereto, comprising:

a printing blanket cylinder having a printing blanket thereon with *a printing image that has* a blank area [corresponding to a predetermined] *which results in an* area *on an exterior surface of rotation* of a container on which no ink is *to be* applied;

inking assemblies for applying ink to the printing blanket;

a support member having a plurality of mandrels for holding containers thereon to be printed;

a support member drive for moving the support member to position each mandrel in sequence at a printing position adjacent the printing blanket;

a mandrel drive for rotating each mandrel positioned [adjacent the printing blanket in order to rotate a container on said mandrel] *at the printing position;*

*a container on said mandrel being rotated* at the printing position against the printing blanket to print on an *area of the same* exterior surface of said container;

a label applying device for applying a label to the [predetermined] area *on the exterior surface* of the container on which no ink is applied *and which is at least partially surrounded by the area of the exterior surface on which printing occurs*, substantially simultaneously with printing of the exterior surface of the container; and a control arrangement for controlling timing of said label applying device, said support member drive and *rotation of* said mandrel [drive] *at the printing position* in a manner to ensure that the label is applied to [the predetermined] *said* area on each container.

6. A machine according to claim [1] *5*, wherein said label applying device is positioned at the printing position.

7. A machine according to claim [1] *5*, wherein the label applying device includes:

a grid positioned in facing relation to the exterior surface of the container to be printed;

a web transport assembly for transporting a web having labels spaced apart thereon to a position adjacent said grid;

a peeling device for peeling each label from said web at said position adjacent said grid;

a vacuum supply behind said grid for applying a vacuum through said grid to hold the peeled label against the grid, with an adhesive side of the label facing out; and an arrangement for applying the held label to the [predetermined] area of the container against the force of the vacuum supply.

8. A machine according to claim 7, wherein said arrangement includes at least one air jet for blowing said held label onto the [predetermined] area of the container.

9. A machine according to claim 7, wherein said peeling device includes a sharp edge about which said web [in] *is* transported.

10. A machine according to claim [1] *5*, wherein said control arrangement includes a central processing unit for controlling said timing.

11. A machine according to claim [1] *5*, further comprising an adjustment arrangement for moving at least a portion of the label applying device relative to the mandrel holding the container to be printed.

12. A machine according to claim 11, wherein said adjustment arrangement includes:

at least one linear adjustment mechanism; and at least one angular adjustment mechanism.

13. A machine according to claim 12, wherein said at least one linear adjustment mechanism includes:

a first linear adjustment assembly for adjusting said at least a portion of the label applying device in a first linear direction;

a second linear adjustment assembly for adjusting said at least a portion of the label applying device in a second linear direction which is substantially orthogonal to said first direction; and a third linear adjustment assembly for adjusting said at least a portion of the label applying device in a third linear direction which is substantially orthogonal to said first and second directions.

14. A machine according to claim 12, wherein said at least one angular adjustment mechanism includes:

a first angular adjustment assembly for adjusting said at least a portion of the label applying device in a first angular direction; and a second angular adjustment assembly for adjusting said at least a portion of the label applying device in second angular direction which is substantially orthogonal to said first angular direction.

15. A machine according to claim 11, wherein said at least a portion of the label applying device includes a grid positioned in facing relation to the mandrel holding the container to be printed, for holding a label thereon.

16. A method for printing on containers and applying labels thereto, comprising the steps of:

applying ink to a printing blanket with a *printing image that has a* blank area [corresponding to a predetermined area] *which results in an area on an exterior surface of rotation* of a container on which no ink is to be applied;

positioning containers *having said external surface of rotation* to be printed on a plurality of mandrels;

moving the mandrels in sequence to a printing position adjacent the printing blanket;

rotating each mandrel positioned [adjacent the printing blanket in order to rotate] *at the printing position;* a container on said mandrel at the printing position *being rotated* against the printing blanket to print on an *area of the same* exterior surface of said container;

applying a label to the [predetermined] area of *the same exterior surface of* each container on which no ink is applied *and which is at least partially surrounded by said area of the exterior surface on which printing occurs*, substantially simultaneously with the printing on the container; and controlling timing of said steps of label application, mandrel movement and mandrel rotation in a manner to ensure that the label is applied to [the predetermined] *said* area on each container.

17. A method according to claim 16, wherein said step of applying the label includes the step of applying the label at the printing position.

18. A method according to claim 16, wherein said step of applying the label uses a label applying device including a grid positioned in facing relation to a mandrel holding a container, and includes the steps of:

transporting a web having labels spaced apart thereon to a position adjacent said grid;

peeling each label from said web at said position adjacent said grid;

applying a vacuum through said grid to hold the peeled label against the grid, with an adhesive [aide] *side* of the label facing out; and forcing the held label on the [predetermined] area of the container against the force of the vacuum supply.

19. A method according to claim 18, wherein said step of [positioning] *applying the label* includes the step of blowing said held label onto the [predetermined] area of the container.

20. A method according to claim 18, wherein said step of peeling includes the step of transporting the web around a sharp edge adjacent the grid.

21. A method according to claim 16, further comprising the step of adjusting the position of at least a portion of the label applying device relative to a position at which the label is to be applied to the container.

22. A method according to claim 21, wherein said step of adjusting includes the steps of:

providing at least one linear adjustment of said at least a portion of the label applying device relative to the label applying position; and providing at least one angular adjustment of said at least a portion of the label applying device relative to the label applying position.

23. A method according to claim 22, wherein said step of providing at least one linear adjustment [mechanism] includes the steps of:

adjusting said at least a portion of the label applying device in a first linear direction;

adjusting said at least a portion of the label applying device in a second linear direction which is substantially orthogonal to said first direction; and adjusting said at least a portion of the label applying device in a third linear direction which is substantially orthogonal to said first and second directions.

24. A method according to claim 22, wherein said step of providing at least one angular adjustment mechanism includes the steps of:

adjusting said at least a portion of the label applying device in a first angular direction; and adjusting said at least a portion of the label applying device in a second angular direction which is substantially orthogonal to said first angular direction.

* * * * *